INVENTOR
DONALD B. HUNTTING
BY S. Jay Teller
ATTORNEY

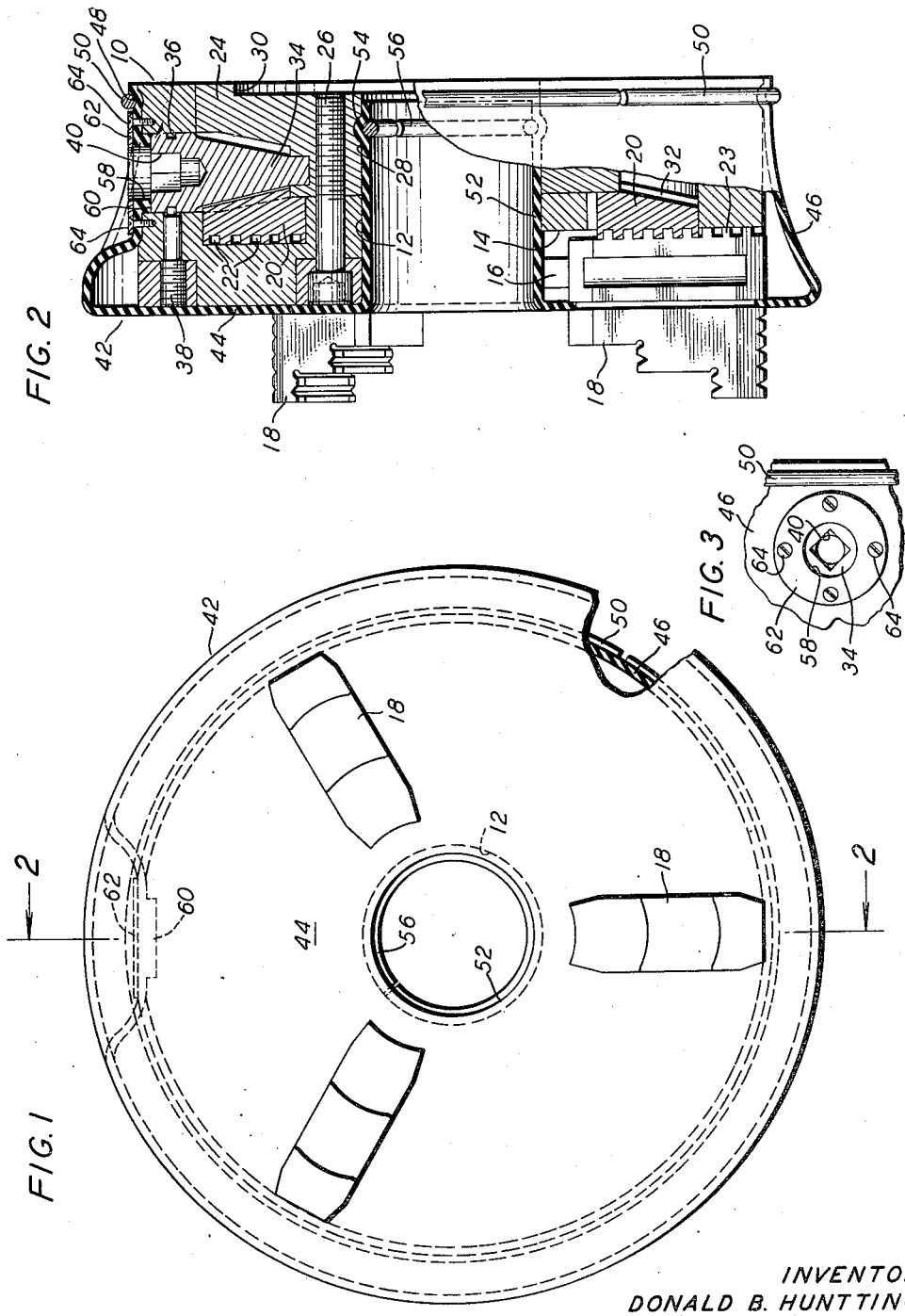
Jan. 16, 1951 — D. B. HUNTTING — 2,538,521
CHUCK AND DUST EXCLUDING JACKET THEREFOR
Filed Feb. 10, 1949 — 2 Sheets-Sheet 1
INVENTOR
DONALD B. HUNTTING
BY S. Jay Teller
ATTORNEY Jan. 16, 1951  D. B. HUNTTING  2,538,521
CHUCK AND DUST EXCLUDING JACKET THEREFOR
Filed Feb. 10, 1949  2 Sheets-Sheet 2

Patented Jan. 16, 1951

2,538,521

UNITED STATES PATENT OFFICE 2,538,521

CHUCK AND DUST EXCLUDING JACKET THEREFOR

Donald B. Huntting, West Hartford, Conn., assignor to The E. Horton & Son Company, Windsor Locks, Conn., a corporation of Connecticut Application February 10, 1949, Serial No. 75,618

19 Claims. (Cl. 279—116)

1

The invention is applicable particularly to a rotatable chuck having radially movable work-engaging jaws at the front. Such a chuck is ordinarily used on a lathe or other machine which rotates the chuck and the work piece held thereby.

A chuck of this type is frequently used for grinding operations and when so used dust and abrasive material from the grinding wheel enter the interior of the chuck and cause serious wear on the relatively movable parts of the chuck. The general object of the present invention is to provide a flexible jacket for the chuck, this jacket excluding dust and abrasive material from the interior of the chuck but nevertheless permitting the necessary radial movement of the chuck jaws.

In the drawings I have shown in detail several embodiments of the invention, but it will be understood that various changes may be made from the constructions shown, and that the drawings are not to be construed as defining or limiting the scope of the invention, the claims forming a part of this specification being relied upon for that purpose.

Of the drawings:

Fig. 1 is a front view of a chuck and chuck jacket embodying the invention.

Fig. 2 is a sectional view of the chuck and chuck jacket taken along the line 2—2 of Fig. 1, the lower right portion being shown in elevation.

Fig. 3 is a fragmentary top view.

Figure 4:
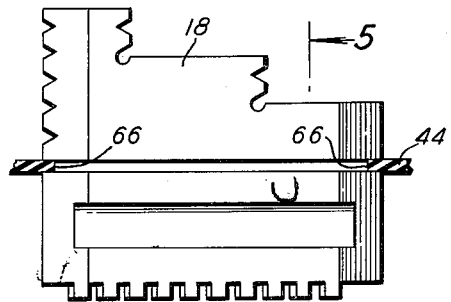
Fig. 4 is an enlarged side view of one of the chuck jaws as shown in Figs. 1 and 2, a portion of the jacket being shown in section.

The drawings show one form of chuck with which a dust excluding jacket may advantageously be used, but it will be understood that the invention is not limited to a chuck having the particular construction shown. The chuck as illustrated comprises a generally cylindrical body indicated at 10, this having a cylindrical outer wall or face and a flat front face. The

2 chuck body has a central opening 12 extending entirely therethrough and concentric with the peripheral cylindrical wall. The chuck body has a plurality of radial grooves 14, ordinarily three, the sides of the grooves being formed to constitute guideways 16, 16, as shown in Fig. 3, for holding and guiding radially movable work engaging jaws 18, 18. Ordinarily and as shown, each jaw 18 is provided with longitudinal grooves into which fit tongues at the sides of the grooves 14, these tongues constituting parts of the guideways 16, 16 for the jaws.

Means is provided for moving or adjusting the jaws 18, 18 radially along the grooves 14. This means may be varied, as the invention is applicable generally to chucks having radially movable jaws. Any usual or preferred jaw moving or adjustment means may be used, and one such moving or adjusting means is shown as an example. As shown, there is an annular scroll member 20 which is entered in an annular recess in the chuck body, the said annular recess being open at the rear to receive the scroll member. In accordance with conventional practice the forward face of the scroll member 20 is provided with a plurality of spiral grooves 22, 22 and the rear face of each chuck jaw 18 is provided with rearward projecting teeth 23 which are shaped to enter and fit the spiral grooves 22 in the scroll member 20. When the scroll member 20 is rotated the jaws 18, 18 are moved radially inward or outward in unison.

The chuck body 10 is provided at its rear with a large circular recess in which is fitted a rear plate 24, the plate 24 being connected with the body by any suitable means such as screws 26, 26. The body 10 and the rear plate 24 will be herein referred to collectively as constituting a "body unit." The plate 24 has a central opening 28 which registers with the central opening 12 in the chuck body and the said plate 24 otherwise completely closes the chuck at the rear. The plate 24 may have a recess 30 which is used in the mounting of the chuck on a lathe face plate or otherwise. The mounting means for the chuck is not fully shown as it does not constitute any part of the present invention.

The scroll member is provided at its rear with bevel gear teeth 32 which mesh with teeth formed on a bevel pinion 34 rotatable about a radial axis. The bevel pinion 34 is rotatably supported at its inner end in a bearing aperture in the rear plate 24 and is rotatably supported at its outer end in a bearing aperture in the body 10. The pinion 34 has a circumferential groove 36 and a screw 38 is provided which is entered in a threaded aperture in the body 10. The end of the screw 38 enters the circumferential grooves 36 in the bevel pinion to prevent the pinion from moving longitudinally. The pinion 34 has a socket opening 40 therein for receiving a wrench by means of which the bevel pinion can be turned to rotate the scroll member 20 and thus move the jaws 18, 18.

For excluding abrasive material and other dust or extraneous material from the interior of the chuck there is provided a jacket 42 formed of a flexible material. The material of the jacket may be widely varied but it may be a synthetic rubber or a rubber substitute, preferably resistant to oil and grease.

The jacket 42 includes a front portion 44 having spaced openings therein through which the jaws 18, 18 extend, the jacket closely fitting the jaws at the edges of the openings. The front portion 44 has sufficient pliability and resilience to permit the jaws 18, 18 to be adjusted or moved radially as required. With the jaws in any positions of adjustment the front portion 44 of the jacket prevents any dust or other material from entering the grooves 14, 14 from the front.

The jacket 42 also includes an integral peripheral portion 46 which extends over the outer ends of the grooves 14, 14 and which engages and fits the periphery of the body unit. This peripheral portion 46 prevents dust or other material from entering the grooves 14, 14 at the outer ends thereof. In some instances dependence may be placed entirely on the resiliency of the peripheral portion 46 to insure a close fit with the periphery of the body unit. Preferably, however, the body 10 is provided with an annular groove 48 near the rear, the peripheral portion 46 of the jacket being shaped to enter the said groove. A split resilient wire ring 50 is provided which can be snapped into place at the outside of the peripheral portion 46 opposite the groove 48. Thus the ring 50 serves in cooperation with the groove 48 to hold the peripheral portion 46 in firm engagement.

The jacket 42 also includes an integral central portion 52 which extends over the inner ends of the grooves 14, 14 and which engages and fits the wall of the opening 12 in the body unit. This central portion 52 prevents dust or other material from entering the grooves 14, 14 at the inner ends thereof. In some instances dependence may be placed entirely on the resiliency of the central portion 52 to insure a close fit with the wall of the opening 12. Preferably, however, the wall of the opening 12 is provided with an annular groove 54 near the rear, the central portion 52 of the jacket being shaped to enter the said groove. A split resilient wire ring 56 is provided which can be snapped into place at the inside of the central portion 52 opposite the groove 54. Thus the ring 56 serves in cooperation with the groove 54 to hold the central portion 52 in firm engagement.

In order to facilitate radial adjustment or movement of the jaws 18, 18, the jacket is provided with a suitable amount of slack so that the portions of the jacket immediately adjacent the jaws may move freely with the jaws. Figs. 1 and 2 of the drawings show the jaws at or near their outermost positions. The central portion 44 of the jacket extends outward beyond the periphery of the front face of the body unit and the peripheral portion 46 of the jacket is bulged outward to join the extending periphery of the front portion 44. In this way the requisite amount of slack is provided. It will be understood that when the jaws are moved radially inward from the positions shown the slack at the periphery is taken up and a corresponding amount of slack is formed at the central hole 12.

When the chuck is provided with a radial rotatable member such as 34 for effecting the radial adjustment or movement of the jaws, it is necessary or at least preferable to provide the peripheral portion 46 of the jacket with an opening 58 which registers with the said radially rotatable member so as to permit access thereto. In order to prevent dust or other material from entering the opening in which the radially rotatable member 34 is located, the peripheral portion 46 of the jacket is preferably formed to engage the body unit at the area immediately surrounding the opening 58. As shown, the peripheral portion 46 has an integral annular rib 60 which surrounds the opening 58 and which is entered in the opening for the rotatable member 34. The inner face of the rib 60 engages the outer face of the rotatable member 34 to form a dust-tight joint. A flat washer 62 is provided having an opening which registers with the opening 58. The washer 62 is apertured to receive screws 64, 64 which extend through the adjacent portion of the jacket and into suitable threaded holes in the body. When the screws are tightened the portion of the jacket immediately surrounding the opening 58 is held in firm engagement with the chuck body.

It has been stated that the edges of the openings in the front portion 44 of the jacket closely fit the jaws 18, 18. The edges of the openings may merely engage with the peripheral portions of the jaws, but as shown more clearly in Figs. 4 and 5, each jaw 18 preferably has grooves 66, 66 in the ends therof and grooves 68, 68 in the sides thereof, these grooves being near the front face of the body. The material of the jacket portion 44 extends into the said grooves 66, 66 and 68, 68, and by reason of the grooves there is a firmer engagement between the jacket portion and the jaws. If necessary or desirable the material of the jacket may be cemented in place in the grooves but this is ordinarily not essential.

Figure 5:
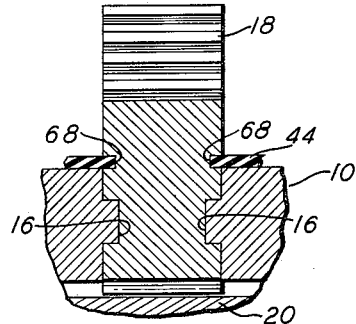
Fig. 5 is a sectional view taken along the line 5—5 of Fig. 4, this view also showing fragmentary portions of other chuck parts.
Figure 6:
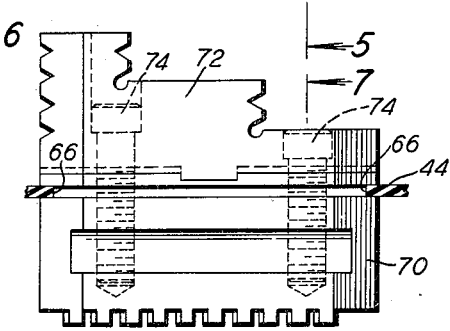
Figs. 6 and 7 are views similar respectively to Figs. 4 and 5, but showing an alternative jaw construction.
Figure 7:
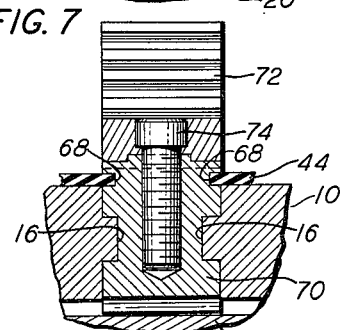

Figs. 6 and 7 are generally similar to Figs. 4 and 5 but show an alternative jaw construction. A master jaw part 70 is provided which is similar to the rear portion of the jaw 18 as already described. There is also provided a front jaw part 72 which is detachably connected with the master jaw part 70 as for instance by means of screws 74, 74. With this construction the front jaw parts 72 are readily detachable so that they can be replaced by other front jaw parts adapted to meet special requirements. The grooves for the jacket are formed in the master jaw part and it will therefore be apparent that the front jaw parts can be removed and replaced without disturbing the engagement of the master jaw parts with the jacket.

Figure 8:
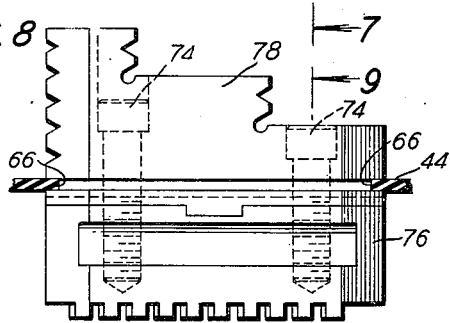
Figs. 8 and 9 are views similar respectively to Figs. 4 and 5, but showing another alternative jaw construction.
Figure 9:
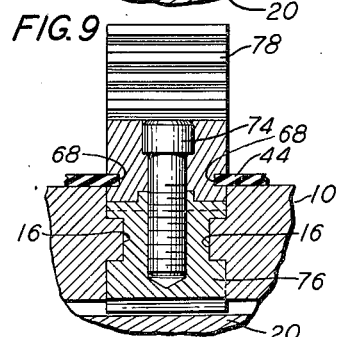

Figs. 8 and 9 are similar to Figs. 6 and 7 but show another alternative construction. The construction shown in Figs. 8 and 9 includes a master jaw part 76 and a front jaw part 78, the construction differing from that shown in Figs. 6 and 7 in that the division between the two parts is behind the front face of the chuck body so that the grooves for the jacket are formed in the front jaw part rather than in the master jaw part. With this construction it is necessary or at least desirable to remove the jacket when the front jaw parts 78 are removed. The front jaw parts 78 and the jacket may constitute a permanent assembly which can be put in place or removed from a chuck as required. With this construction the standard chuck may be regarded as having only the master jaw parts 76 and there may be provided a plurality of assemblies of front jaw parts and jackets, the front jaw parts of the several assemblies differing from each other as to their adaptability for special purposes. When the chuck is to be equipped with a certain set of front jaw parts such as 78 the said front jaw parts and the attached jacket are put in place and fastened as already described.

Figure 10:
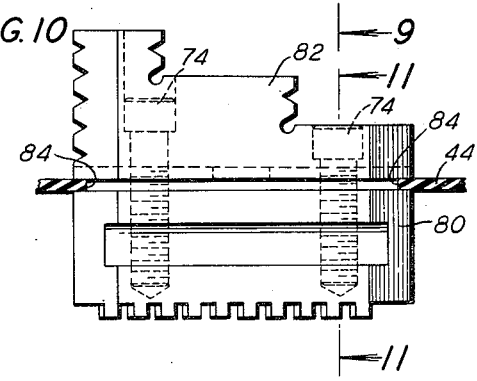
Figs. 10 and 11 are views similar respectively to Figs. 4 and 5, but showing still another alternative jaw construction.
Figure 11:
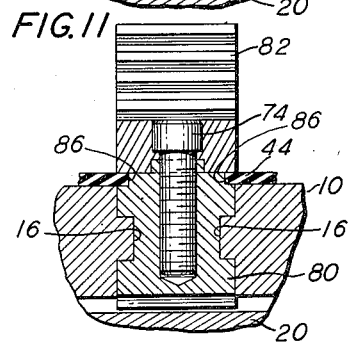

Figs. 10 and 11 are also generally similar to Figs. 6 and 7 but show still another embodiment of the invention. There is a master jaw part 80 and a front jaw part 82, these being connectible by screws as already described. Instead of forming the jacket grooves entirely in the master jaw parts as shown in Figs. 6 and 7, or entirely in the front jaw parts as shown in Figs. 8 and 9, the grooves are formed between the master jaw parts and the front jaw parts. As shown, the master jaw part 80 is provided with rabbets at the ends and at the sides and the front jaw part overlies the rabbets to provide the necessary grooves for the jacket. The depth of the rabbets may be such that the jacket is gripped or squeezed when the front jaw part is put in place and secured.

What I claim is:

1. The combination of a rotatable chuck including a cylindrical body unit and also including radially movable jaws carried by the body unit and projecting at the front thereof, and a dust excluding jacket formed of flexible material and comprising a portion at the front of the body unit having spaced openings therein through which the jaws extend with the edges of the openings fitting the jaws.

2. The combination of a rotatable chuck including a cylindrical body unit having radial grooves open at their outer ends and also including jaws radially movable in the grooves and projecting at the front of the body unit, and a dust excluding jacket formed of flexible material and comprising a portion at the front of the body unit having spaced openings therein through which the jaws extend with the edges of the openings fitting the jaws and also comprising a peripheral portion extending over the outer ends of the grooves and engaging and fitting the periphery of the body unit.

3. The combination of a rotatable chuck including a cylindrical body unit having radial grooves open at their outer ends and also including jaws radially movable in the grooves and projecting at the front of the body unit, and a dust excluding jacket formed of flexible material and comprising a portion at the front of the body unit having spaced openings therein through which the jaws extend with the edges of the openings fitting the jaws and also comprising a peripheral portion extending over the outer ends of the grooves and engaging and fitting the periphery of the body unit, the said portions of the jacket including slack at the periphery to permit inward radial movement of the jaws.

4. The combination of a rotatable chuck including a cylindrical body unit having a central opening and having radial grooves open at their outer and inner ends, the said chuck also including jaws radially movable in the grooves and projecting at the front of the body unit, and a dust excluding jacket formed of flexible material and comprising a portion at the front of the body unit having spaced openings therein through which the jaws extend with the edges of the openings fitting the jaws, the said jacket also comprising peripheral and central portions extending over the ends of the grooves and engaging and fitting the body unit at the periphery thereof and at the wall of the central opening therein.

5. The combination of a rotatable chuck including a cylindrical body unit having a central opening and having radial grooves open at their outer and inner ends, the said chuck also including jaws radially movable in the grooves and projecting at the front of the body unit, a dust excluding jacket formed of flexible material and comprising a portion at the front of the body unit having spaced openings therein through which the jaws extend with the edges of the openings fitting the jaws, the said jacket also comprising peripheral and central portions extending over the ends of the grooves and engaging and fitting the body unit at the periphery thereof and at the wall of the central opening therein, and a spring wire engaging the peripheral portion of the jacket to hold it in firm engagement with the chuck body unit.

6. The combination of a rotatable chuck including a cylindrical body unit having a central opening and having radial grooves open at their outer and inner ends, the said chuck also including jaws radially movable in the grooves and projecting at the front of the body unit, a dust excluding jacket formed of flexible material and comprising a portion at the front of the body unit having spaced openings therein through which the jaws extend with the edges of the openings fitting the jaws, the said jacket also comprising peripheral and central portions extending over the ends of the grooves and engaging and fitting the body unit at the periphery thereof and at the wall of the central opening therein, a spring wire engaging the peripheral portion of the jacket to hold it in firm engagement with the chuck body unit, and a spring wire engaging the central portion of the jacket to hold it in firm engagement with the wall of the central opening in the chuck body unit.

7. The combination of a rotatable chuck including a cylindrical body unit and also including radially movable jaws carried by the body unit and projecting at the front thereof, each jaw having grooves therein at all sides thereof which grooves are close to the front face of the chuck body, and a dust excluding jacket formed of flexible material and comprising a portion at the front of the body unit having spaced openings therein through which the jaws extend with the material of the jacket at the edges of the openings extending into and fitting the grooves in the jaws.

8. The combination of a rotatable chuck including a cylindrical body unit and also including radially movable jaws carried by the body unit and projecting at the front thereof, each jaw comprising a master part and a front part detachably connected to the master part and each master part having grooves therein at all sides thereof which grooves are close to the front face of the chuck body unit, and a dust excluding jacket formed of flexible material and comprising a portion at the front of the body unit having spaced openings therein through which the jaws extend with the material of the jacket at the edges of the openings extending into and fitting the grooves in the master parts of the jaws.

9. The combination of a rotatable chuck including a cylindrical body unit and also including radially movable jaws carried by the body unit and projecting at the front thereof, each jaw comprising a master part and a front part detachably connected to the master part and each front part having grooves therein at all sides thereof which grooves are close to the front face of the chuck body unit, and a dust excluding jacket formed of flexible material and comprising a portion at the front of the body unit having spaced openings therein through which the jaws extend with the material of the jacket at the edges of the openings extending into and fitting the grooves in the front parts of the jaws.

10. The combination of a rotatable chuck including a cylindrical body unit and also including radially movable jaws carried by the body unit and projecting at the front thereof, each jaw comprising a master part and a front part detachably connected to the master part and the said master and front parts of the jaws being spaced apart at all sides thereof to provide grooves between them which are close to the front face of the body unit, and a dust excluding jacket formed of flexible material and comprising a portion at the front of the body unit having spaced openings therein through which the jaws extend with the material of the jacket at the edges of the openings extending into and fitting the grooves between the master and front parts of the jaws.

11. The combination of a rotatable chuck including a cylindrical body unit and also including radially movable jaws carried by the body unit and projecting at the front thereof, the said chuck having means for moving the jaws radially which means includes a radial rotatable member having its outer end accessible at the periphery of the body unit, and a dust excluding jacket formed of flexible material and comprising a portion at the front of the body unit having spaced openings therein through which the jaws extend with the edges of the openings fitting the jaws and also comprising a peripheral portion engaging and fitting the periphery of the body unit, the said peripheral portion of the jacket having an opening therein registering with the said rotatable member to permit access thereto.

12. The combination of a rotatable chuck including a cylindrical body unit and also including radially movable jaws carried by the body unit and projecting at the front thereof, the said chuck having means for moving the jaws radially which means includes a radial rotatable member having its outer end accessible at the periphery of the body unit, and a dust excluding jacket formed of flexible material and comprising a portion at the front of the body unit having spaced openings therein through which the jaws extend with the edges of the openings fitting the jaws and also comprising a peripheral portion engaging and fitting the periphery of the body unit, the said peripheral portion of the jacket having an opening therein registering with the said rotatable member to permit access thereto and the said peripheral portion engaging and fitting the body unit at the area immediately surrounding the said opening in the peripheral portion.

13. The combination of a rotatable chuck including a cylindrical body unit and also including radially movable jaws carried by the body unit and projecting at the front thereof, the said chuck having means for moving the jaws radially which means includes a radial rotatable member having its outer end accessible at the periphery of the body unit, and a dust excluding jacket formed of flexible material and comprising a portion at the front of the body unit having spaced openings therein through which the jaws extend with the edges of the openings fitting the jaws and also comprising a peripheral portion engaging and fitting the periphery of the body unit, the said peripheral portion of the jacket having an opening therein registering with the said rotatable member to permit access thereto and the said peripheral portion having an annular rib which engages and fits the outer end of the said rotatable member.

14. A dust excluding jacket for use with a rotatable chuck including a cylindrical body unit and also including radially movable jaws carried by the body unit and projecting at the front thereof, the said jacket being formed of flexible material and comprising a portion positionable at the front of the body unit of the chuck and having spaced openings therein positioned and shaped to engage and fit the respective jaws of the chuck.

15. A dust excluding jacket for use with a rotatable chuck including a cylindrical body unit and also including radially movable jaws carried by the body unit and projecting at the front thereof, the said jacket being formed of flexible material and comprising a portion positionable at the front of the body unit of the chuck and having spaced openings therein positioned and shaped to engage and fit the respective jaws of the chuck and also comprising a peripheral portion shaped to engage and fit the periphery of the chuck body unit.

16. A dust excluding jacket for use with a rotatable chuck including a cylindrical body unit having a central opening and also including radially movable jaws carried by the body unit and projecting at the front thereof, the said jacket being formed of flexible material and comprising a portion positionable at the front of the body unit of the chuck and having spaced openings therein positioned and shaped to engage and fit the respective jaws of the chuck and also comprising peripheral and central portions shaped to respectively engage and fit the periphery of the chuck body unit and to engage and fit the wall of the central opening in the chuck body unit.

17. A jaw and jacket combination for use with a rotatable chuck including a cylindrical body unit and also including radially movable master jaws carried by the body unit, the said combination including front jaws connectible respectively with the master jaws and a jacket formed of flexible material and comprising a front portion having openings through which the jaws extend with the edges of the openings fitting the jaws.

18. A jaw and jacket combination for use with a rotatable chuck including a cylindrical body unit and also including radially movable master jaws carried by the body unit, the said combination including front jaws connectible respectively with the master jaws and a jacket formed of flexible material and comprising a front portion having openings through which the jaws extend with the edges of the openings fitting the jaws, the said jacket also comprising a peripheral portion shaped to engage and fit the periphery of the chuck body unit.

19. A jaw and jacket combination for use with a rotatable chuck including a cylindrical body unit having a central opening and also including radially movable master jaws carried by the body unit, the said combination including front jaws connectible respectively with the master jaws and a jacket formed of flexible material and comprising a front portion having openings through which the jaws extend with the edges of the openings fitting the jaws, the said jacket also comprising peripheral and central portions shaped to respectively engage and fit the periphery of the chuck body unit and to engage and fit the wall of the central opening in the chuck body unit.

DONALD B. HUNTTING.

REFERENCES CITED

The following references are of record in the file of this patent:

UNITED STATES PATENTS

| Number | Name | Date |
|---|---|---|
| 818,993 | Barr | Apr. 24, 1906 |
| 1,007,132 | Miller | Oct. 31, 1911 |
| 1,046,523 | Whiton | Dec. 10, 1912 |
| 1,528,433 | Kay | Mar. 3, 1925 |
| 1,582,010 | Hanson | Apr. 20, 1926 |
| 1,794,511 | Bush | Mar. 3, 1931 |
| 2,153,847 | Scruggs | Apr. 11, 1939 |
| 2,376,594 | Hite | May 22, 1945 |
| 2,380,648 | Hite | July 31, 1945 |